United States Patent [19]

Walker

[11] Patent Number: 4,475,613

[45] Date of Patent: Oct. 9, 1984

[54] POWER OPERATED CHAIR

[76] Inventor: Thomas E. Walker, 333 S. Euclid Ave., San Diego, Calif. 92114

[21] Appl. No.: 429,107

[22] Filed: Sep. 30, 1982

[51] Int. Cl.³ .......... B62D 61/00

[52] U.S. Cl. .......... 180/22; 180/907

[58] Field of Search .......... 180/21, 22, 907

[56] References Cited

U.S. PATENT DOCUMENTS

| | | | |
|---|---|---|---|
| 668,262 | 2/1901 | Melvin | 180/21 |
| 2,495,573 | 1/1950 | Duke | 180/907 |
| 2,625,230 | 1/1953 | Burkhardt | 180/21 |
| 2,891,370 | 6/1959 | Musgrave | 180/21 |
| 3,930,551 | 1/1976 | Cragg | 180/907 |

*Primary Examiner*—John A. Pekar
*Assistant Examiner*—Kenneth R. Rice
*Attorney, Agent, or Firm*—Charles C. Logan, II

[57] ABSTRACT

A power operated chair having a base frame assembly, a chair assembly mounted on the base frame assembly, and an internal combustion engine mounted on the base frame assembly. A fuel tank is mounted on the back of the chair assembly. One or two rear drive wheels are rotatably mounted on a transversely extending rear axle that is supported from the base frame assembly. If one wheel is utilized it would be centrally positioned along the length of the rear axle and if two drive wheels are used they would be centrally placed along the length of the rear axle and close enough to each other so that a differential gear assembly would not be necessary between them. A pair of laterally spaced steerable front wheels are mounted to the forward end of the base frame assembly and a pair of laterally spaced rear wheels that are non-steerable are mounted to the rearward end of the base frame assembly. There is also a drive system connecting the internal combustion engine to the rear drive wheel. The drive wheel has a bottom surface spaced vertically lower than the bottom surface of each of the laterally spaced rear wheels so that when the power operated chair is oriented in a level state, the laterally spaced wheels do not touch the ground.

11 Claims, 4 Drawing Figures

POWER OPERATED CHAIR

BACKGROUND OF THE INVENTION

The present invention relates to a power operated wheelchair and more specifically one that is powered by an internal combustion engine.

In the past, power operated wheelchairs have been known but these have always been powered by electric batteries. The normal drive system for these wheel chairs includes a separate electric motor which is used to drive the respective laterally spaced rear drive wheels. Also the steering for these wheelchairs is accomplished through the electric motors connected to the rear drive wheels. An example of such a present day wheelchair is illustrated in U.S. Pat. No. 3,930,551.

It is an object of the invention to provide a novel power operated wheelchair that is driven by an internal combustion engine.

It is also an object of the invention to provide a novel power operated wheelchair whose rear singular or dual drive wheels are located in such a manner that the wheelchair can be turned in an extremely small turning radius.

It is also an object of the invention to provide a novel power operated wheelchair having disc-brakes.

It is another object of the invention to provide a novel power operated wheelchair having a unique front steering system.

It is an additional object of the invention to provide a novel power operated wheelchair which is suitable for both indoor and outdoor use.

It is a further object of the invention to provide a novel power operated wheelchair which eliminates the necessity of recharging the batteries that are used on the usual electric motordriven wheelchair.

SUMMARY OF THE INVENTION

Applicant's novel power operated wheelchair is driven by an internal combustion engine. The wheelchair has a base frame assembly upon which is mounted a chair assembly. A fuel tank is mounted on the back of the chair assembly.

The drive system for the power operated wheelchair consists primarily of one or two rear drive wheels that are rotatably mounted on a transversely extending rear axle that is supported from the base frame assembly. A sprocket gear on this rear axle is connected by a chain to a sprocket gear mounted on a forwardly positioned laterally extending shaft. A pulley on this shaft is driven by a belt that also engages a pulley on the driveshaft of the internal combustion engine. Steering for the power operated wheelchair is accomplised by a pair of laterally spaced steerable front wheels that are mounted to the forward end of the base assembly. The front wheels are tied together by a tie rod so that they will turn in unison and an upwardly extending handle is pivotally attached both to the base frame assembly and the tie rod structure to control the steering of the front wheels. A throttle grip is also attached to the top of the steering handle to control the speed at which the power operated chair can travel. Do to the combination of the rear drive wheels being mounted in the midlength position of the rear axle and the steerable front wheels, the power operated wheelchair is capable of turning about in extremely small radius.

The bottom surface of the drive wheel is spaced vertically lower than the bottom surface of each of the laterally spaced rear wheels so that when the power operated chair is oriented in a level state, the laterally spaced rear wheels do not touch the ground. The laterally spaced rear wheels are designed to function only during turns when the wheelchair tends to tilt too far in either lateral direction. The drive wheel is of a pneumatically inflatable type.

The axes of rotation of the drive wheel and the front wheels are respectively rearwardly and forwardly of the chair frame assembly to promote better stability during operation of the power operated wheelchair. The overall width of the power operated wheelchair is less than 28 inches so that it will pass through your standard doorways in a house thereby making it usuable both indoors and outdoors. The power operated wheelchair that is illustrated shows the use of a hand pull starting cord but it is to understood that an electric starting system could be used. Also the drive wheels could be driven directly from the internal combustion engine if so desired. Additional changes could also be made in the positioning of several of the different components mounted on the power operated wheelchair without changing the basic functional characteristics of the wheelchair.

DESCRIPTION OF THE PREFERRED EMBODIMENT

Figure 1:
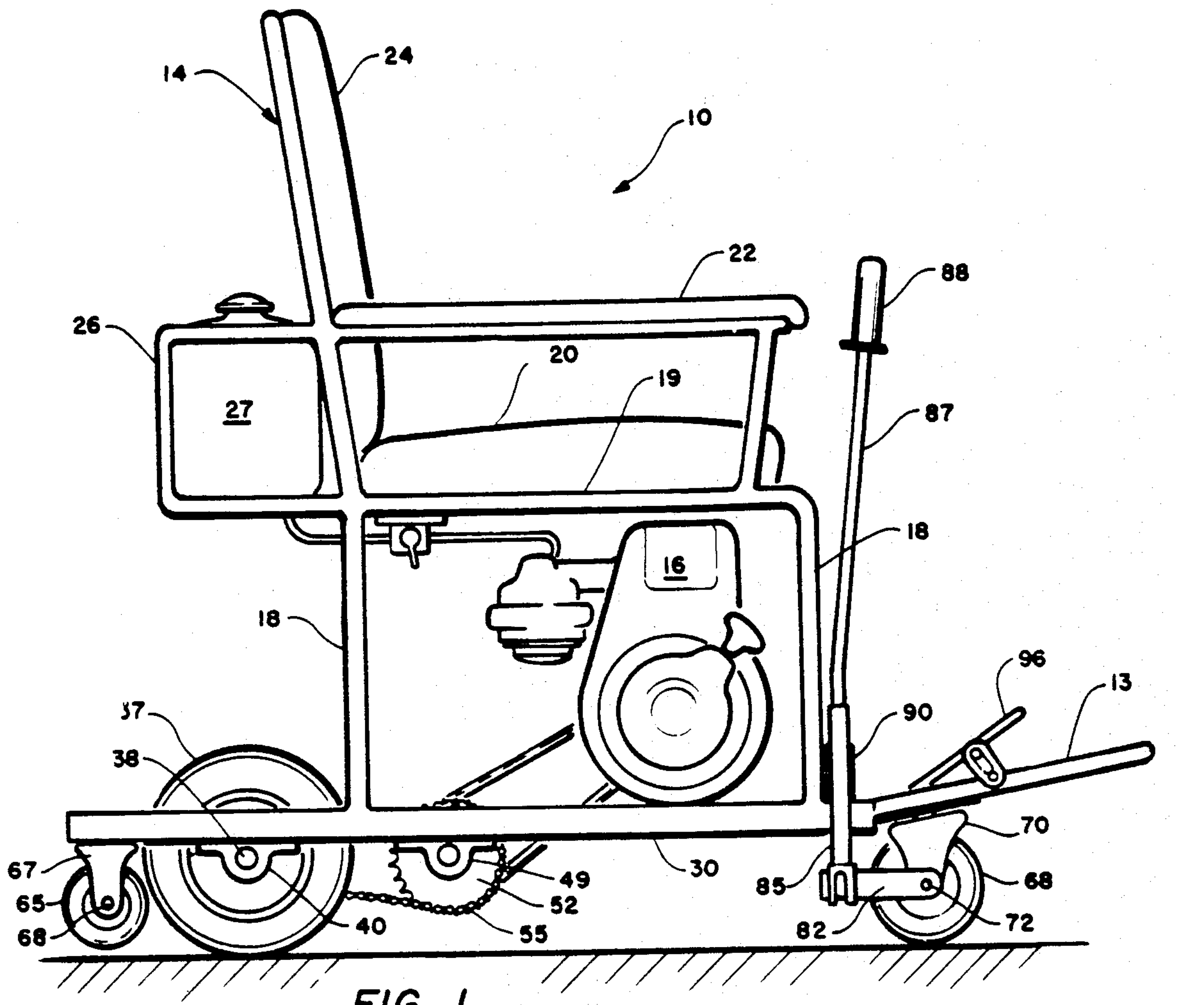
FIG. 1 is a side elevation view of the novel power operated wheelchair.
Figure 2:
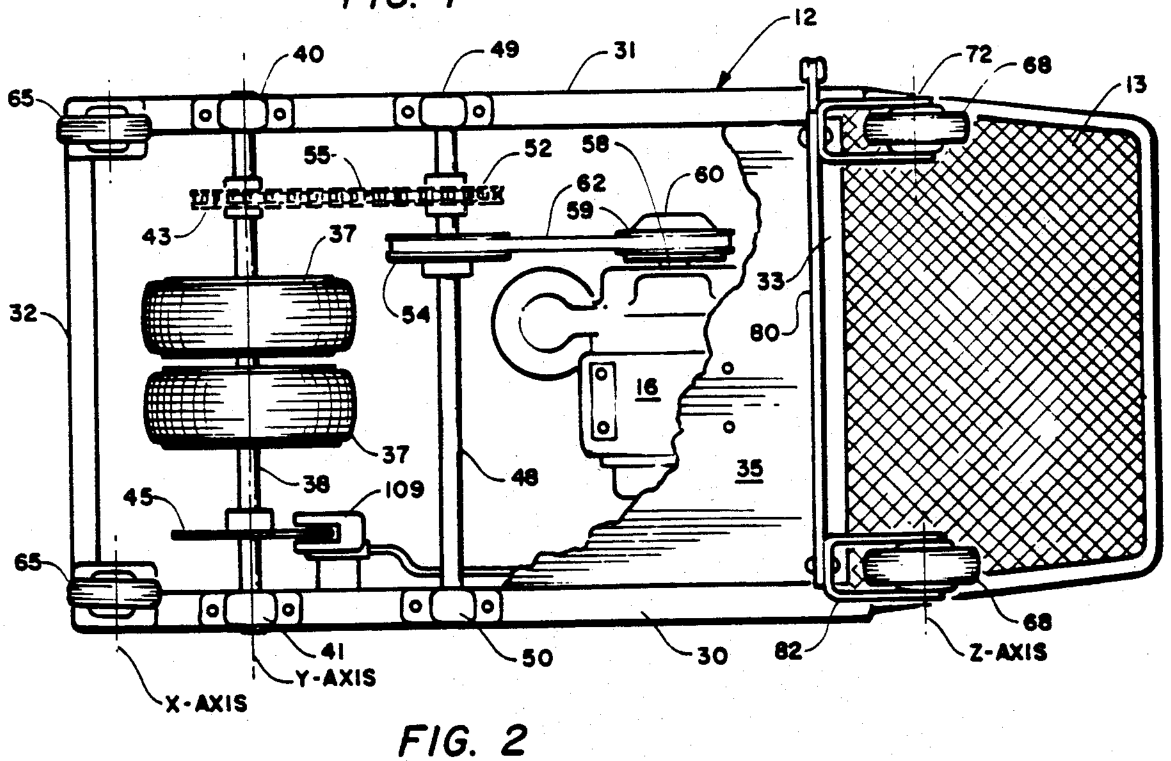
FIG. 2 is a bottom schematic plan view of the novel power operated wheelchair.

The novel power operated wheelchair will be described by referring to the drawings. The power operated wheelchair is generally designated numeral 10. It has a base frame assembly 12, a chair assembly 14 mounted on the base frame assembly 12, and an internal combustion engine 16 mounted on the base frame assembly.

Chair assembly 14 has a plurality of legs 18 extending upwardly from the base frame assembly. Seat support members 19 are connected between the respective leg members 18. A seat unit 20 is supported by members 19 and arm rest supports 22 are also connected to support members 19. A back rest unit 24 is mounted on the rear of chair assembly 14. A fuel tank mounting frame 26 is attached to the rear of chair assembly 14 and it supports fuel tank 27.

Base frame assembly 12 is basically formed from laterally spaced longtitudinally extending side members 30 and 31, rear cross member 32, and front cross member 33. An engine support plate 35 covers the forward part of base frame assembly 12 and internal combustion engine 16 is mounted thereon.

The rear drive wheels 37 are rotatably mounted on axle 38 which has a Y-axis. The opposite ends of axle 38 are supported in pillow block bearings 40 and 41 that are attached to the underside of side frame members 31 and 30 respectively. Also mounted on axle 38 is a sprocket gear 43 and a brake rotor disc 45.

Positioned forwardly from axle 38 is a laterally extending shaft 48 having its opposite ends supported in pillow block bearings 49 and 50. A sprocket gear 52 and a pulley 54 are mounted on shaft 48. A chain 55 passes around sprocket gears 43 and 52 to transmit the rotational movement of shaft 48 to the rear drive wheels 37.

Engine 16 has a driveshaft 58 upon which is mounted a pulley 59 and a clutch 60. A belt 62 passes around pulleys 54 and 59 to transmit the rotational motion of driveshaft 58 to shaft 48.

A pair of laterally spaced rear wheels 65 are mounted to the rearward end of base frame assembly 12 by U-shaped mounting brackets 67. Rear wheels 65 have axles 68 that are aligned on a common X-axis.

Figure 3:
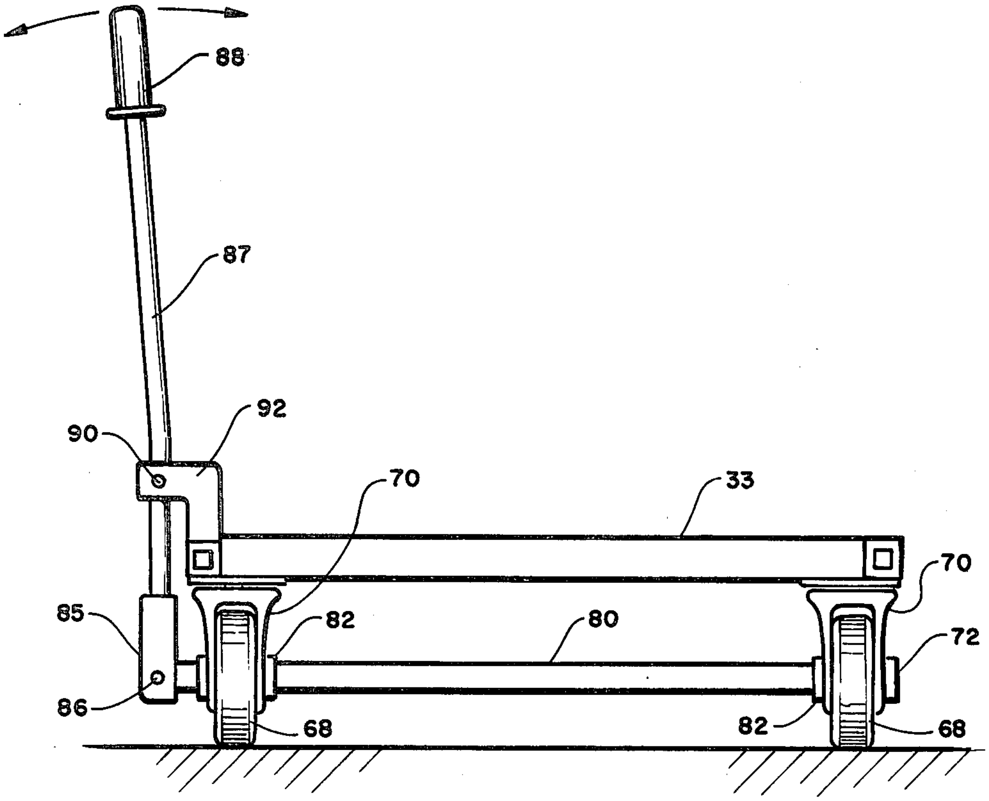
FIG. 3 is an isolated front elevation view of the novel front wheel steering mechanism.

A pair of laterally spaced steerable front wheels 68 are mounted to the forward end of base frame assembly 12 on the underside of foot platform 13 by casters 70. Front wheels 68 have axles 72 that have a common Z-axis. The steering mechanism for front wheel 68 has been so designed that they will steet together in unision. This is accomplished by tie rod 80 which has U-shaped brackets 82 both attached to the tie rod and also to the axle 72 of front wheels 68. Attached to one end of tie rod 80 is a bracket 85 having bifurcated fingers at its lower end along with a pivot pin 86 that passes through tie rod 80. A handle 87 has its lower end connected to bracket 85 and it has a hand throttle 88 mounted on its top end for controlling the speed of the engine 16. Handle 87 is pivoted about a pin 90 that passes through bifurcated fingers on the end of L-shaped bracket 92. The bottom end of bracket 92 is rigidly connected to base frame assembly 12. In FIG. 3 it can be easily seen how lateral motion of handle 87 will produce coordinated turning of the respective front wheels 68.

Figure 4:
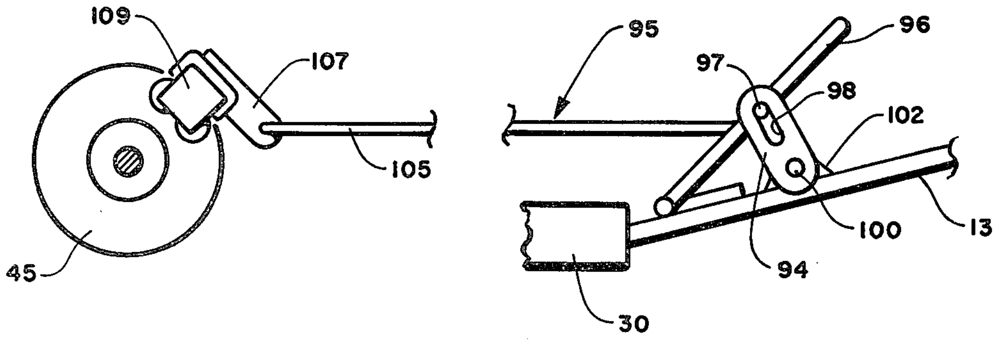
FIG. 4 is an isolated side elevation view of the braking system for the novel power operated wheelchair.

The braking system for the power operated chair 10 may be more easily understood by referring to FIG. 4. The foot brake assembly 95 has a foot pedal 96 with a laterally extending pin 97 that is captured in slot 98 of lever 99. The bottom end of lever 99 is pivotally mounted on pin 100 that extends from bracket 102 that is secured to the foot platform 13. Connecting rod 105 has its forward end attached to pin 97 and its rearward end attached to lever 107 which is in turn connected to disc brake assembly 109. A downward pressure by the driver of the power operated chair upon brake pedal 96 will cause the actuation of disc brake assembly 109 upon disc rotor 45.

What is claimed is:

1. A power operated chair comprising:
- a base frame assembly;
- a chair assembly mounted on said base frame assembly;
- an internal combustion engine mounted on said power operated chair;
- a fuel tank mounted on said power operated chair;
- at least one rear drive wheel, said rear wheel rotatably mounted on a transversely extending rear axle that is supported from said base frame assembly;
- a pair of laterally spaced steerable front wheels and means mounting said front wheels to the forward end of said base frame assembly, the axis of rotation of said laterally spaced front wheels is located longitudinally forwardly of said chair assembly;
- a pair of laterally spaced rear wheels and means mounting them to the rearward end of said base frame assembly, said drive wheel being mounted inwardly of both of said laterally spaced rear wheels, said laterally spaced rear wheels being supported independently of each other and the axis around which these wheels rotate is rearwardly spaced from the axis about which said drive wheel rotates;
- a foot platform extending forwardly a predetermined distance from the front end of said base frame assembly, said foot platform also extending forwardly of said pair of laterally spaced steerable front wheels to form a protective barrier for said front wheels and also the feet of the person riding said power operated chair;
- a disc brake assembly mounted on said rear axle;
- a foot brake assembly comprising a foot brake pedal pivotally mounted on said foot platform, and connecting rod means whose forward end is connected to said foot pedal and whose rearward end is connected to said disc brake assembly; and
- drive means connecting said internal combustion engine to said rear drive wheel.

2. A power operated chair as recited in claim 1 wherein said chair assembly comprises a plurality of support legs, a seat unit mounted on said legs, a back rest unit mounted at the rear of said seat unit and a pair of laterally spaced arm supports mounted on opposite lateral sides of said seat unit.

3. A power operated chair as recited in claim 1 wherein said drive wheel has its bottom surface spaced vertically lower than the bottom surface of each of said laterally spaced rear wheels so that when the power operated chair is oriented in a level state, said laterally spaced rear wheels do not touch the ground.

4. A power operated chair as recited in claim 1 wherein said base frame assembly comprises two laterally spaced longitudinally extending side members, a front cross member, and a rear cross member.

5. A power operated chair as recited in claim 1 wherein there are at least two drive wheels and they are positioned laterally adjacent each other on said axle, thereby, eliminating the need for a differential gear assembly between them.

6. A power operated chair as recited in claim 1 wherein the overall width of said power operated chair is less than twenty-eight inches.

7. A power operated chair as recited in claim 1 further comprising steering means for said front wheels that will turn both wheels in unison.

8. A power operated chair as recited in claim 7 wherein said steering means has a steering handle having a hand throttle mounted adjacent the top end of said steering handle.

9. A power operated chair as recited in claim 7 wherein said steering means comprises a tie rod whose opposite ends are connected to brackets attached to the respective front wheels, an upright steering handle has its bottom end pivotally connected to said tie rod, spaced upwardly from the bottom end of said steering handle it is also connected to a fixed axis of a bracket rigidly connected to said base frame assembly.

10. A power operated chair as recited in claim 1 wherein said drive means comprises a sprocket gear mounted on said rear axle, a transversely extending forward axle that is supported from said base frame assembly, a sprocket gear and a pulley mounted on said forward axle, a drive chain passing around said two sprocket gears, a pulley and clutch mounted on the drive shaft of said internal combustion engine, and a fan belt passing around said two pulleys.

11. A power operated chair as recited in claim 1 wherein the height of said base frame assembly above ground level is less than ninety (90) percent of the height of said rear drive wheel.

* * * * *